April 11, 1961
S. J. ROSSI
2,979,016
AMPHIBIOUS CONVERSION ATTACHMENTS FOR
AUTOMOBILES AND LIKE VEHICLES
Filed April 12, 1957
6 Sheets-Sheet 5
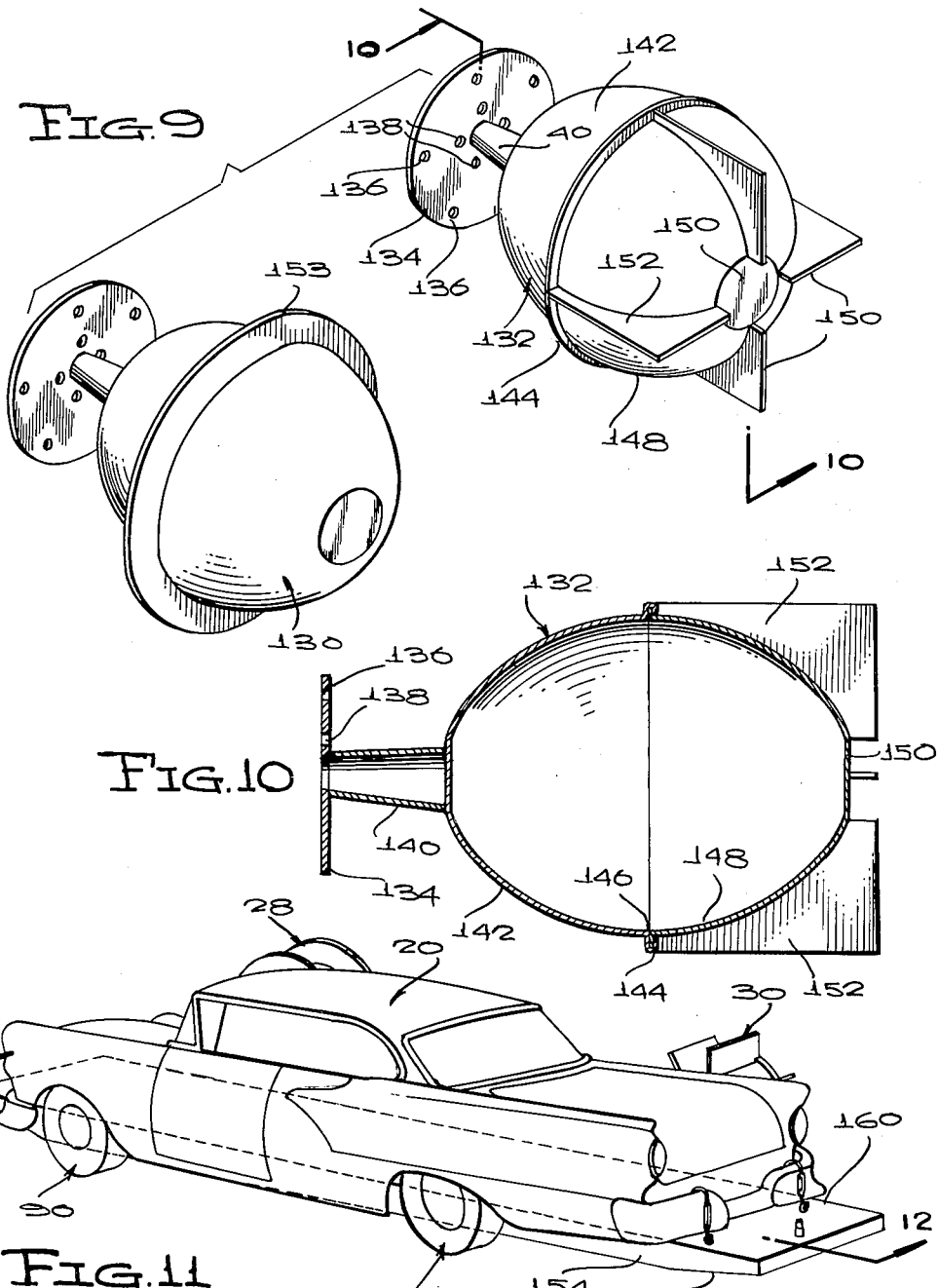
INVENTOR.
SIDNEY J. ROSSI
BY
McMorrow, Berman & Davidson
ATTORNEYS April 11, 1961
S. J. ROSSI
2,979,016
AMPHIBIOUS CONVERSION ATTACHMENTS FOR AUTOMOBILES AND LIKE VEHICLES
Filed April 12, 1957
6 Sheets-Sheet 6
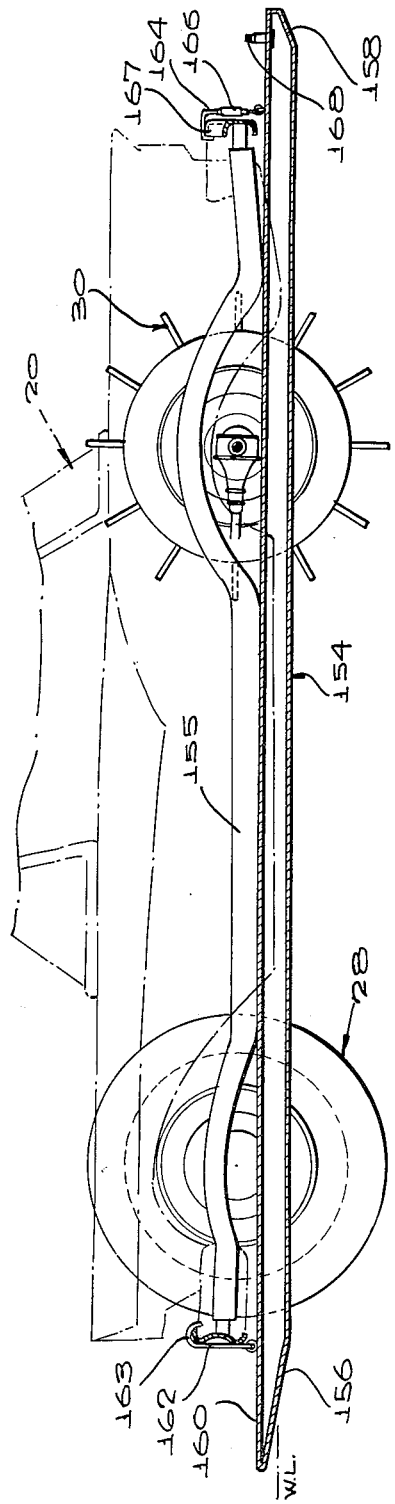
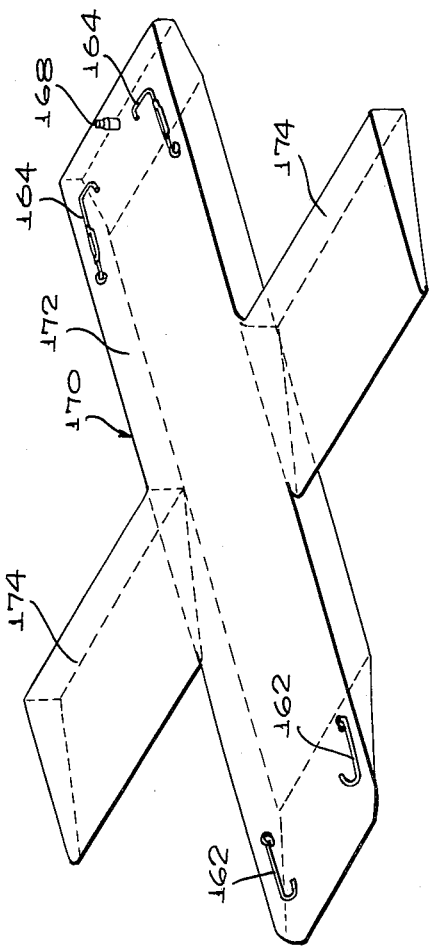
INVENTOR.
SIDNEY J. ROSSI
BY
McMorrow, Berman & Davidson
ATTORNEYS United States Patent Office 2,979,016
Patented Apr. 11, 1961

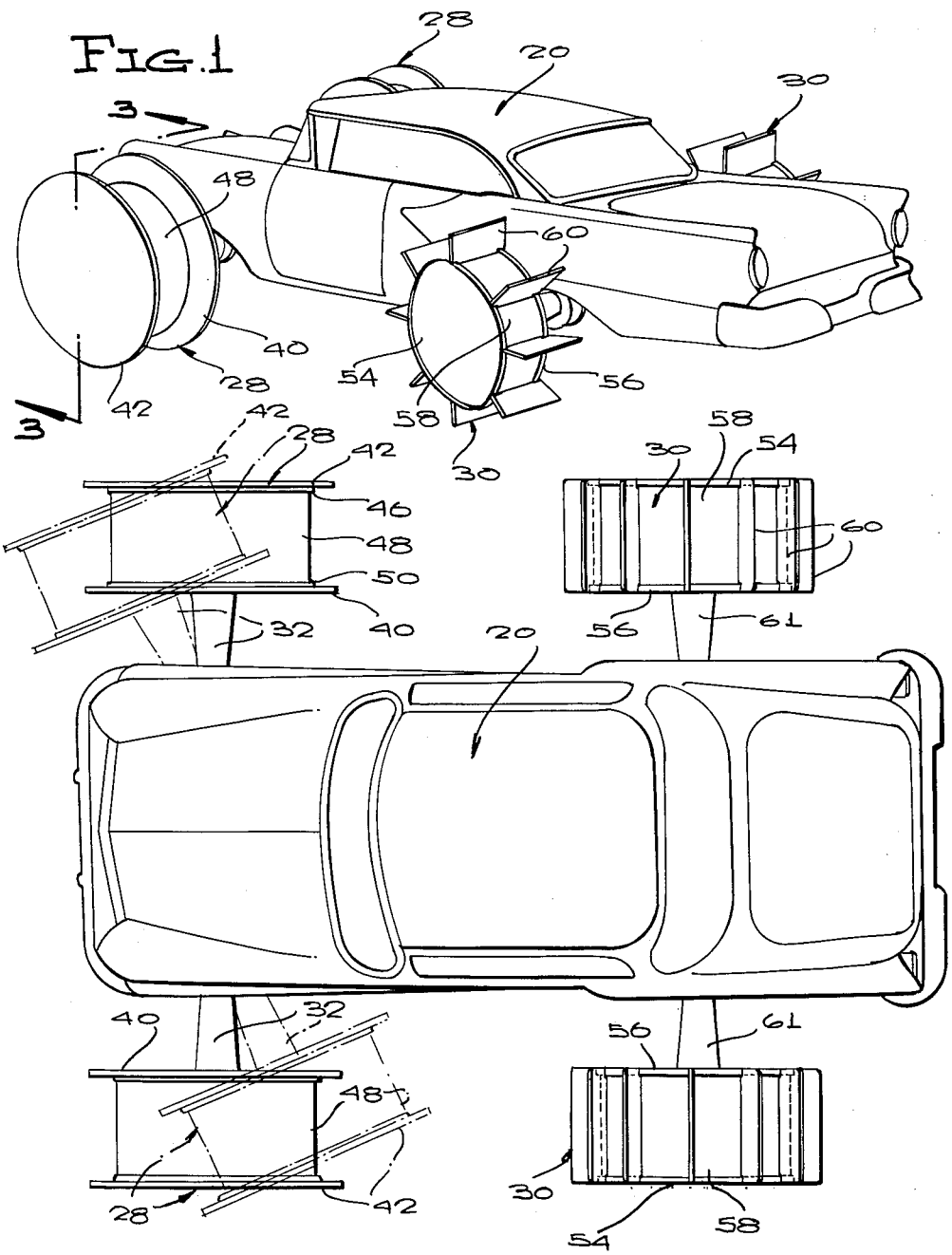

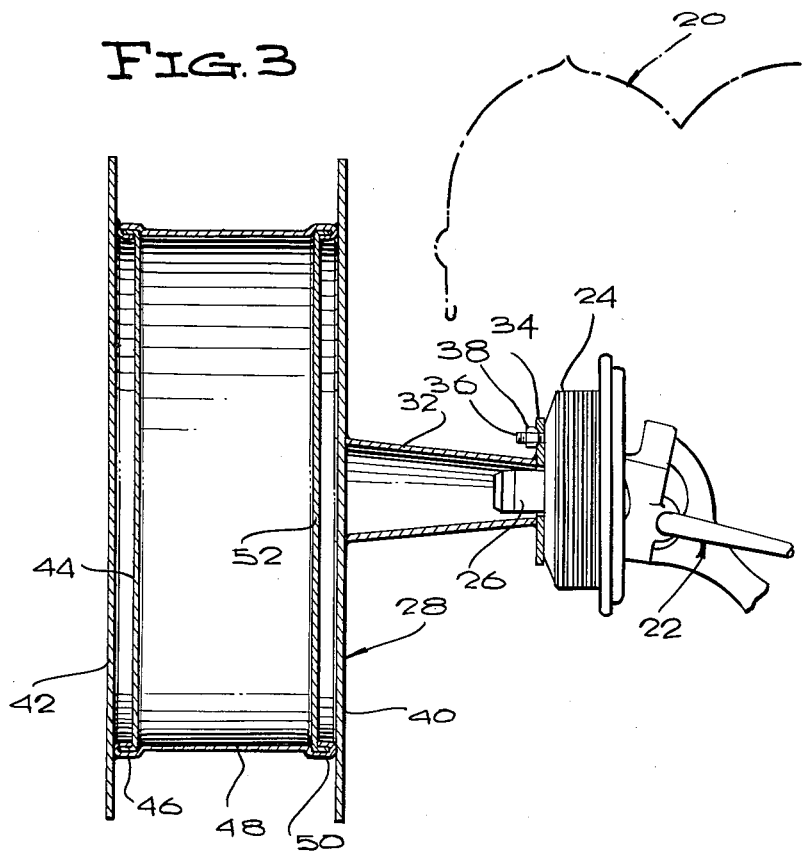
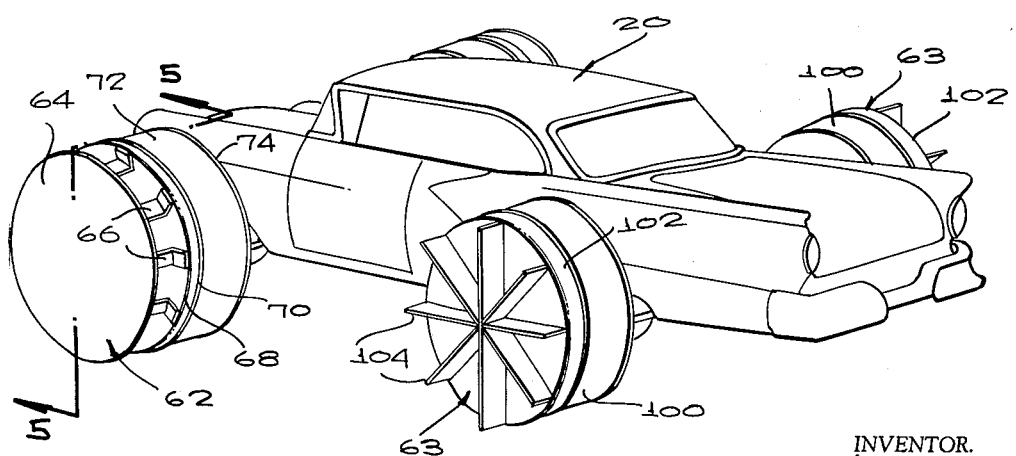

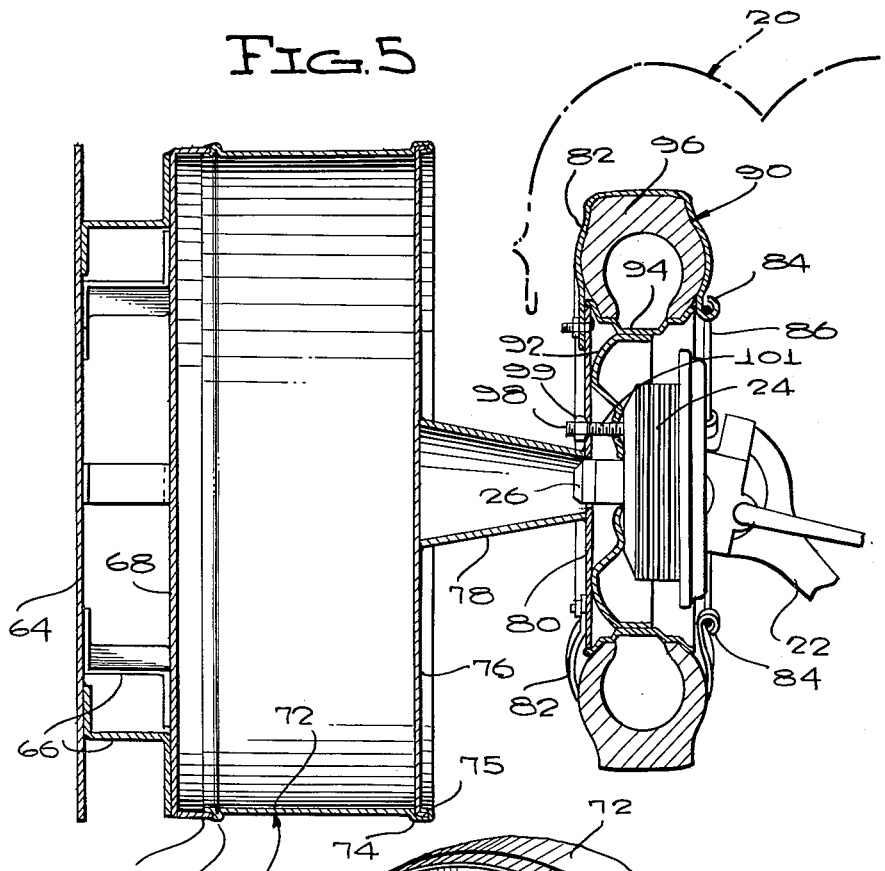
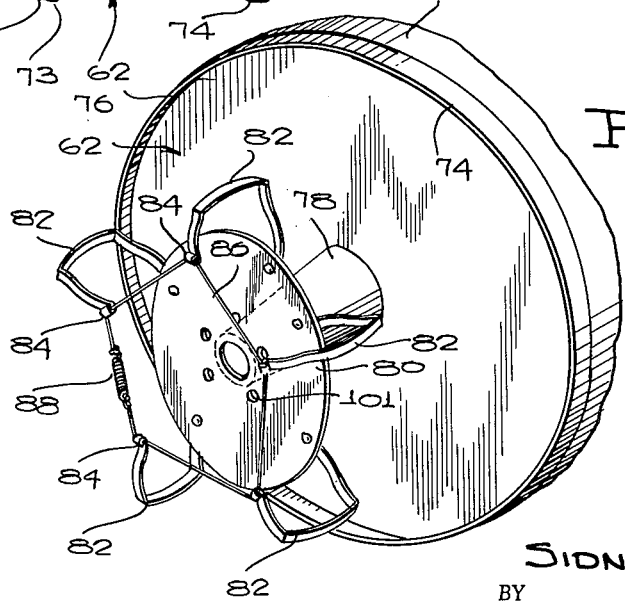

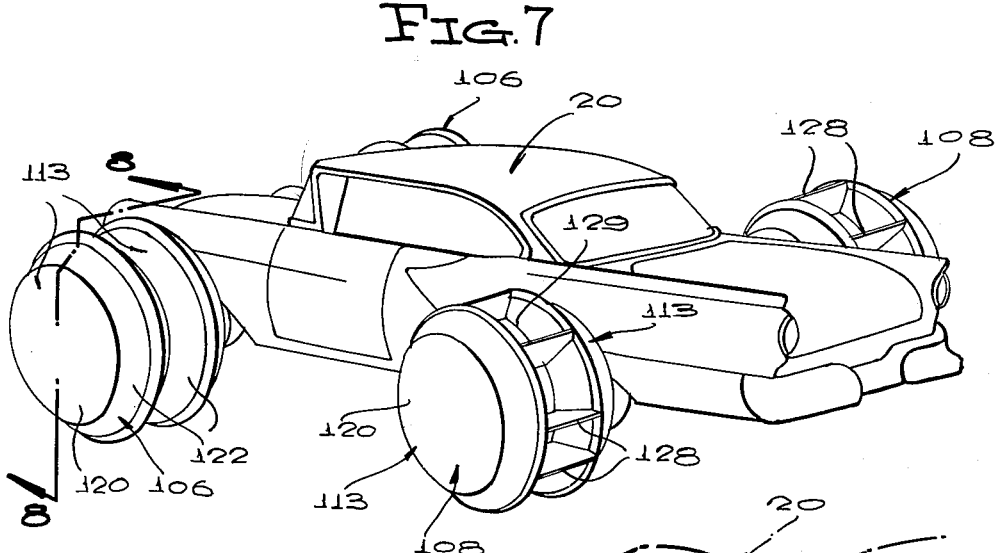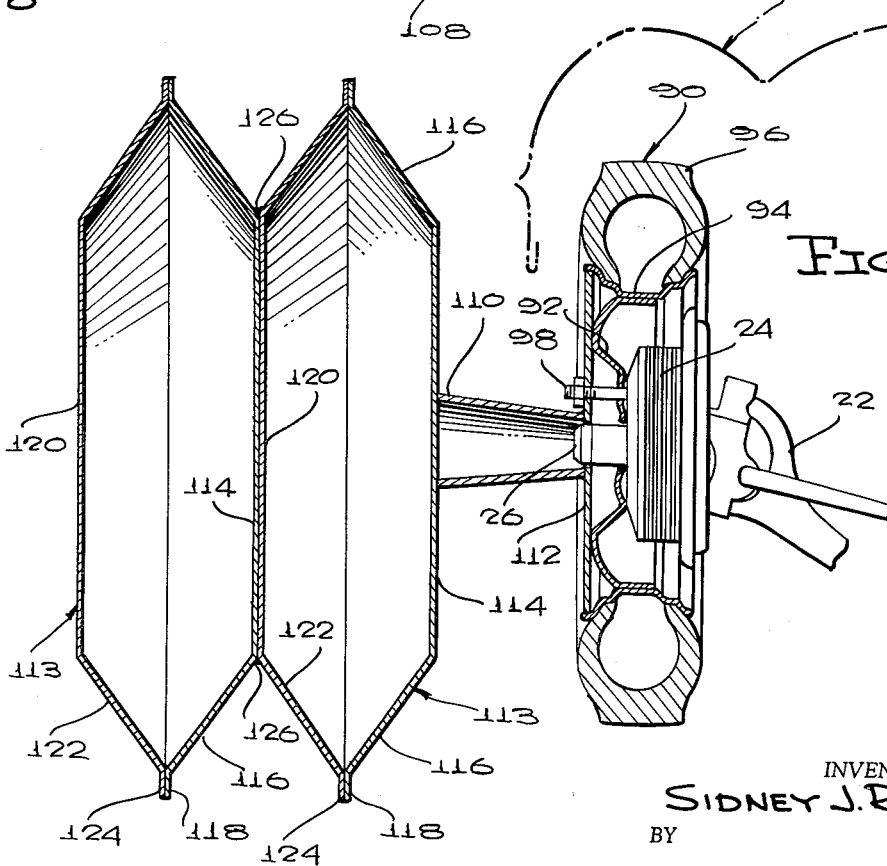

2,979,016

AMPHIBIOUS CONVERSION ATTACHMENTS FOR AUTOMOBILES AND LIKE VEHICLES

Sidney J. Rossi, 4307 Airline Highway, Rainbow Motel, New Orleans, La.

Filed Apr. 12, 1957, Ser. No. 652,514

4 Claims. (Cl. 115—1)

This invention relates to improvements in attachments for the wheels of automobiles, trucks, and similar vehicles, designed to convert said vehicles into amphibious vehicles, so that they may be floated in and driven through water.

The primary object of the invention is to provide novel and improved means for the swift, easy, and inexpensive conversion of a wholly conventional land vehicle, such as an ordinary passenger automobile or truck, into a vehicle that may be floated upon and be driven in water, without modification or redesign of the vehicle construction, except perhaps to a very minor and wholly inconsequential degree.

Another object of the invention is to provide a conversion means of the character stated which embodying buoyant hollow, wheel attachments capable of being swiftly and easily connected to extend laterally outwardly from the front and rear wheels or hubs of a vehicle, normally without removal of the wheels.

A further object of the invention is to provide attachments of the character indicated above, which enable a vehicle to be steered and driven in water by the same steering and drive mechanisms as are used on land.

Another object of the invention is to provide novel and improved wheel attachments of the character indicated which not only support great weight in relation to the overall size of the attachments, but which facilitates steering and driving the vehicle in water.

A further object of the invention is to provide attachments of the type described which facilitate operation of a vehicle not only in water, but also in swampy or muddy terrain.

A further object of the invention is to provide wheel attachments that they can be located on opposite sides of a dock onto which the vehicle can be driven, and attached to the vehicle directly from the dock, the vehicle then being operable along a descending ramp from the dock into the water. In this way, the wheel attachments may be employed as commercial vehicle-floating means, to be used in place of a ferry for the purpose of moving vehicles across a stream, the arrangement being such that the wheel tanks may be attachable to any conventional wheel hubs, in many instances in no more than a few minutes, the detachment being capable of being effected in a correspondingly short time.

A further object of the invention is to provide under-vehicle float means which is easily attached to the vehicle without expensive and time-consuming operations, having hook devices to be hooked directly onto the front and rear bumpers of the vehicle without requiring special tools.

Still another object of the invention is to provide a vehicle conversion means of the character stated which has no moving parts, and which can be provided at exceedingly low cost, considering the benefits to be obtained from the use thereof.

Other objects will appear from the following description, and from the annexed drawing, in which like reference characters designate like parts throughout the several views, and wherein:

Figure 1 is a perspective view of a conventional automobile, equipped with conversion wheel means according to the present invention;

Figure 2 is a top plan view of Figure 1, the front wheel means being shown in full and in dotted line positions to which they can be turned in steering the vehicle during operation thereof in the water;

Figure 3 is a sectional view, on an enlarged scale, taken substantially on line 3—3 of Figure 1, with dotted lines showing the vehicle fragmentarily, the vehicle wheel hub and adjacent components of the vehicle being illustrated fragmentarily and in elevation;

Figure 4 is a perspective view of a passenger automobile equipped with a modified set of front and rear wheel conversion means;

Figure 5 is an enlarged sectional view similar to Figure 3, taken substantially on line 5—5 of Figure 4, the vehicle wheels being left on their hubs and the wheel means being connected directly to the vehicle wheels;

Figure 6 is a fragmentary perspective view of the inner side of one of the front wheel means, detached from a vehicle wheel;

Figure 7 is a perspective view of a passenger automobile equipped with a second modification of wheel means;

Figure 8 is a view similar to Figure 5, taken substantially on line 8—8 of Figure 7;

Figure 9 is an exploded perspective view of another pair of modified wheel means, shown per se;

Figure 10 is an enlarged, longitudinal sectional view through one of the drive wheels of the set shown in Figure 9, taken substantially on line 10—10 of Figure 9;

Figure 11 is a perspective view of a passenger automobile equipped with a float means according to the invention, and with wheel means such as are shown in Figure 1, two of the wheel means being removed for the purpose of showing details of construction of the float means;

Figure 12 is a longitudinal sectional view, on an enlarged scale, taken substantially on line 12—12 of Figure 11, the vehicle chassis being shown in full lines and the body being shown in dotted lines; and Figure 13 is a perspective view of a modified float means as seen from below, per se.

Referring to the drawing in detail, in the illustration of the invention provided in Figures 1-3, there is shown a conventional passenger automobile generally designated 20. At this point, it will be understood that the automobile 20 could be a truck of any desired size, or any other self-propelled land vehicle, having a usual steerable front wheel assembly generally designated at 22, having hubs 24 from which extends spindle 26.

In the form of the invention shown in Figures 1-3, the conventional vehicle wheels 22 are removed from their hubs, and in place thereof there are mounted buoyant front wheels 28 and buoyant rear wheels 30. The front wheels 28 are steerable as shown in Figure 2, while the rear wheels constitute drive wheels, so that when the vehicle is floated upon the several buoyant wheels, it is steered and driven in the same manner as on land.

Considering first the construction of the front wheels 28, these are in the form of flanged drums (see Figure 3), which drums are hermetically sealed. It will be understood, at this point, that no particular dimensions, drum capacities, etc. will be specified in this application, since the dimensions and capacities will vary according to the size and weight of the particular vehicle 20 on which the wheels are to be mounted. It is sufficient to note, it is thought, that since a one-hundred gallon drum will support about 750 lbs. on water, four drums or hollow wheels of this capacity would be sufficient to float a small passenger automobile. For floating larger vehicles, each drum would be greater, and might for example be of 200 gallon capacity.

Further, the drums could be of various shapes, that is, elliptical, spherical, cylindrical, barrel-shaped, etc.

In the illustrated example, each wheel 28 includes a frustro-conical, hollow spindle 32 (Figure 3), the spindle tapering in a direction toward hub 24 and being adapted, at its smaller end, to receive the vehicle wheel spindle 26. As previously noted, the conventional wheel of the vehicle is removed in this instance.

Welded to the smaller end of the spindle 32 is a flat, circular, attaching plate 34 lying in a plane normal to the length of the spindle 32 so as to be disposed flat against the hub 24. Plate 34 is centrally apertured to receive spindle 26, and has a series of apertures arranged annularly about its center opening to receive the conventional studs 36 of the vehicle, on which nuts 38 are threaded against plate 34.

At its larger, outer end, the hollow spindle 32 is welded or otherwise fixedly secured to a flat, large-diameter, circular, inner side plate 40 of wheel 28, spaced from and lying in a plane parallel to the plane of an outer side plate 42 of corresponding diameter.

A drum head or partition 44 is spaced closely from outer side plate 42, and has an outwardly directed circumferential flange engaged sealingly, fixedly in a circumferential groove defined by the reversely bent flange 46 of a cylindrical, hollow body 48 extending between side plates 40, 42. Body 48 is formed with a reversely bent, circumferentially extending flange 50 adjacent plate 40, receiving the outwardly directed peripheral flange of an inner drum head 52.

Since the body 48 is of a diameter smaller than that of either plate 40, 42, there results a hollow, sealed wheel having flat sides and formed with outwardly directed, flat flanges on both its inner and outer sides. Extending inwardly from said wheel is a hollow, tapered spindle 32 as previously described, having the means 34 for detachably but fixedly connecting the buoyant wheel 28 to the conventional vehicle hub 24.

It becomes apparent, thus, that when the auxiliary front wheels are attached, they can be attached with as much speed as one would change a wheel on a vehicle, that is, it is merely necessary to remove the conventional front wheels that are provided on the vehicle and substitute therefor the buoyant wheels constituting the invention, all without any modification or redesign of the vehicle. When this is done, the buoyant front wheels are steerable in the same manner as the ordinary vehicle wheels, and at the same time, they provide buoyancy for the front end of the vehicle sufficient to float the same on the water.

Referring now to the rear or drive wheels 30, these are also formed as large-diameter, hollow drums, having outer and inner side plates 54, 56 between which is extended a cylindrical drum body 58 sealingly connected to the peripheries of the outer and inner side plates. Fixedly secured to and uniformly, angularly spaced circumferentially of the drum body 58 are flat, transversely disposed, radially outwardly extending paddles 60.

Fixedly secured to and extending inwardly from the inner side plates 56 of the drive wheels 30 are hollow, tapering spindles 61 similar to the spindles 72. The spindles 61 would be provided with mounting plates identical to the plates 34, so that the rear wheels are attached to the rear wheel hubs in the same manner as the steerable front wheels 28.

It will be appreciated that when the vehicle is floated, it is driven within the water by operation of the vehicle motor in the usual manner, with the vehicle in gear or drive. This rotates the rear wheels, so that by paddle action, the vehicle is propelled forwardly within the water.

It thus becomes apparent, from the descriptions so far provided, that without modification or redesign of the vehicle, the vehicle can be floated, and can be steered and driven in the water in the same manner as it is driven on land, by attachment of front and rear wheels that are mountable upon the vehicle in minimum time, with little more difficulty than is encountered during the normal changing of vehicle wheels.

Referring now to Figures 4–6, there is here shown a modified construction in which steerable front wheels 62 and drive wheels 63 are respectively attached to the front and rear wheels of the vehicle 20.

Referring to Figure 5, each steerable front wheel includes a flat, circular, imperforate outer side plate 64 fixedly connected to and spaced laterally outwardly from an outer drum head 68 by means of a series of Z-shaped connecting brackets 66 welded at their opposite ends to the plate 64 and head 68 respectively. Brackets 66 are uniformly, angularly spaced about the margins of the plate 64 and drum head 68, as shown in Figure 4, with the plate-attached ends of the brackets extending radially inwardly of the wheel and the drum head-attached ends extending radially outwardly of the wheel.

The drum head 68 is of a diameter corresponding to that of plate 64, and at its periphery has a circumferentially extending, continuous, inwardly directed flange 70 welded or otherwise fixedly attached to a hollow, cylindrical drum body 72 which is formed with a peripherally extending lip 73 at the location of the welded connection thereof to the flange 70.

The body 72, along its inner side, has an outwardly offset, reversely bent, circumferential flange 74 defining a groove facing inwardly to receive a peripheral flange 75 formed upon an inner side plate 76, to the center portion of which is welded or otherwise fixedly secured the larger, outer end of a hollow spindle 78 tapering in a direction away from the drum body.

Welded to the smaller end of spindle 78 is the centrally apertured, flat mounting plate 80. This is somewhat greater in diameter than the mounting plate of the first form, and as shown in Figure 6, secured to the margin of mounting plate 80 are U-shaped paddles or clamps 82, having outwardly directed hooks 84 at their distal ends, receiving a tensioning cable 86 between the ends of which a contractile spring 88 is connected.

The clamps straddle a conventional vehicle wheel generally designated at 90, at locations uniformly, angularly spaced about the wheel (Figure 5). The wheel, as is usual, includes a wheel body or disc 92, fixedly secured at its periphery to a drop center rim 94 on which is mounted a vehicle tire casing 96, straddled by clamps 82. A slight modification of the vehicle to accommodate the auxiliary wheel includes longer-than-normal, threaded studs 98, carrying lugs or nuts 99 which normally are threaded directly against the wheel discs. To mount the buoyant wheels, one removes the lugs 99, and shifts the mounting plate 80 into position on the stud 98, said plate 80 having lug-receiving openings 101 for this purpose. The lugs are then returned to place, it being understood that the clamps 82 will have been engaged with the vehicle tire in the manner previously described.

It may be noted that many vehicle wheels, instead of having outwardly directed studs 98, are simply formed with threaded openings, receiving removable, threaded lugs that extend through the wheel discs. In such an instance, one would only have to use longer lugs, without any modification or redesign of the vehicle wheel construction itself.

The rear or drive wheels shown in Figure 4 include hollow, sealed drums 100 having means for mounting the same on the rear wheel hubs similar to the means described for the front wheels 62. The hollow drum bodies 100 are similar to the hollow drum bodies 72, and are closed at their outer sides by outer drum heads or plates 102 analogous to the plates 68 having flanges 70, as shown in Figure 5.

Welded or otherwise fixedly secured to the outer faces of the plates 102 are crossing, diametrically extending paddles 104. Each of these extends the full diameter of the hollow drum, the several paddles being uniformly, angularly spaced apart and crossing at the center point of the drum.

The construction shown in Figure 4 operates in the same manner as in the first form of the invention, that is, the rear wheels 63 are driven by the drive means of the vehicle, with the wheels 62 being steerable by the steering mechanism of the vehicle.

In Figures 7 and 8, there is shown another modified construction, again permitting the buoyant steerable and drive wheels 106, 108 respectively to be mounted upon the vehicle wheels without removal of the wheel rims or tire casings (see Figure 8). In this form, the longer studs 98 of the vehicle wheel are again used.

As will be noted, each front wheel includes a hollow, tapering spindle 110 terminating at its inner end in position to receive the spindle 26 of the vehicle wheel. Welded to the spindle 110 is a flat mounting plate 112 apertured to receive studs 98, for connecting the buoyant wheel directly to the vehicle wheel.

The buoyant wheel 106 includes, in this form of the invention, a pair of hollow, side-by-side, fixedly joined drum bodies generally designated 113. Spindle 110 is secured to the inner side plate 114 of the inner body 113. Plate 114 is integral with a shallowly frustro-conical marginal flange 116 that terminates at its periphery in an outwardly directed circumferential lip 118.

The outer side of each drum body includes a flat outer side plate 120 formed with a shallowly frustro-conical marginal flange 122 opposing flange 116 and having a circumferential lip 124 welded sealably to lip 118. The respective drum bodies 113 are welded together at their contacting side plates as shown at 126.

One particular advantage in this construction resides in the fact that should a leak develop in one of the bodies 113, the other will remain sealed, so as to maintain buoyancy in the wheel 106.

Referring now to the drive wheels shown in Figure 7, each wheel 108 includes spaced, hermetically sealed, hollow drum bodies 113. In other words, the bodies 113 shown in Figure 8 are used both in the front and in the rear wheels, with the exception that in the rear wheels, the bodies 113 are spaced apart, rather than welded in face-to-face contact.

Spacing the bodies 113 of each rear wheel apart are radially outwardly extending fins or paddles 128 extending between and welded to the confronting faces of the drum bodies 113, and radiating from a cylindrical connector drum 129 of reduced diameter, also fixedly connected to and extending between the drum bodies 113.

In this form of the invention, the operational characteristics are the same as in the previous forms, that is, wheels 106 are steerable and wheels 108 are the drive wheels, controllable and operable, respectively, by the steering and drive mechanisms of the vehicle in the same manner as in conventional wheels already provided upon the vehicle.

Referring now to Figures 9 and 10, another modification is here shown. In this showing, there are illustrated a steerable front wheel 130 and a rear or drive wheel 132. The wheels shown in Figure 9 would be mounted upon one side of the vehicle, on the front and rear vehicle wheels respectively. Identical but opposite wheels 130, 132 would of course be provided upon the opposite side of the vehicle, the same as in the first form of the invention.

In this form, the rear wheel 132 includes a circular, flat mounting plate 134 having a marginal series of openings 136 and an inner, annular series of openings 138.

Extendable through the openings 136 are fastening elements permitting the attachment of clamps 82, not shown in Figure 9 but illustrated in detail in Figures 5 and 6. Openings 138, of course, are for the lugs 98.

Plate 134 is fixedly secured to the smaller end of a hollow wheel spindle 140 analogous to the spindles previously described. Spindle 140 at its larger end is fixedly secured to the center portion (Figure 10) of an approximately hemispherical drum member 142, having at its larger, outer end a circumferential, reversely bent flange 144 receiving the outwardly directed flange 146 of a complementary outer drum member 148 having a flattened, closed outer end 150. Although the members 142, 148 are approximately hemispherical, when connected they form a drum of approximately truncated ellipsoidal shape. Welded to and angularly spaced uniformly about the member 148 are radial paddles 152.

The steerable front wheel 130 is basically similar to the rear wheel, with respect to the mounting plate, spindle, and hollow drum body. In this form, however, the paddles 152 are omitted, and at the joint between the respective, approximately hemispherical members there is welded a circumferentially extending, planiform plate 153.

The purpose of the plate 153 is to provide a surface which will move obliquely to the path of movement of the vehicle, during steering of the same, so as to act, rudder-fashion, as a steering means for changing the direction of the vehicle in water. The previously described forms are similarly designed with flat-surfaced portions having a rudder-like action.

The wheels shown in Figures 9 and 10 are used in the same manner as the wheels of the forms of the invention previously described herein. In other words, the vehicle is operated in water the same as on land, with wheels 130 being steerable and wheels 132 constituting drive wheels, thus to permit propulsion of the vehicle through the water through operation of the same steering and drive means as is used during movement of the vehicle on land.

Referring now to Figures 11–13, in these figures of the drawing there are illustrated float devices adapted to underlie the vehicle over substantially the full area of the vehicle chassis. The float means are adapted for quick attachment or detachment, and when attached to the vehicle below the chassis, serve to float the vehicle in water, either independently of or auxiliary to the buoyant wheels previously described herein.

In Figures 11 and 12, the float means 154 is of the inflatable, normally collapsed type. Accordingly, when the float means is not in use, it can be collapsed and folded so as to occupy a minimum amount of space in a storage area. When it is to be used, it is readily unfolded and extended beneath the vehicle, and the vehicle can, in fact, be driven into position over the extended float.

The float can be formed of any suitable material, such as those used in the inflatable, normally collapsed life rafts of airplanes, ships, etc. A gaseous propellant maintained under pressure, such as carbon dioxide, may be used to inflate the float, in the same manner as the life raft previously described. This is considered sufficiently obvious as not to require special illustration herein, but if this expedient is resorted to, a suitable cartridge of the gaseous propellant would be provided, capable of being punctured in a manner to cause it to discharge its expanding contents into the interior of the float.

Float 154 is adapted to underlie the chassis 155 of the vehicle, between the vehicle wheels, which of course would also constitute part of the vehicle chassis. In other words, the float extends under the frame of the vehicle, in protectively underlying relation to the transmission, differential, etc.

The bottom surface of the float 154, at the front end of the float, is shallowly beveled as at 156, so as to provide a sled-like action as the vehicle is moved forwardly within the water, the water level being shown in Figure 12 by the indicia "W.L."

At its rear end, the bottom surface of the float 154 is beveled as at 158, to reduce turbulence in the wake of the float.

The top surface of the float is flat from end to end, in this preferred embodiment, as shown in Figure 12, and pivotally attached to the forward end portion of the top surface are transversely spaced hooks 162 adapted to engage over the front bumper 163 of the vehicle. Hooks 164, having turnbuckles or equivalent means 166, hook over the rear bumpers 167 of the vehicle.

Projecting upwardly from the rear end of the float is a valve 168 through which the float may be inflated.

It will be understood that the float could be hermetically sealed so as to define a sealed air chamber therein. Alternatively, the float colud be filled with a buoyant material, such as cork, kapok, etc., and could be of a relatively light, strong material such as aluminum sheeting.

In Figure 13, there is a modified form of a float, in which the float 170 includes a collapsible body 172 which is formed similarly to that shown in Figure 12. Thus, there are provided the hooks 162, the rear hooks 164, and the valve 168.

The construction of Figure 13 is modified through the provision of laterally outwardly projecting, buoyant wings 174, which have beveled undersides, providing a sled-like action similar to that provided by the surface 156 shown in Figure 12. The wings 174 may be in full communication with the body portion of the float, so as to be inflated simultaneously with the float.

In this form of the invention, the wings serve to stabilize the vehicle within the water, in view of the fact that they extend outwardly from the vehicle substantial distances, outrigger-fashion. Again, the float could be filled with a buoyant material and could be rigidly constituted, rather than fully collapsible and inflatable as shown.

The floats of Figures 12 and 13 can be used as means for floating a vehicle, separately and independently of the wheels. Alternatively, they can be used in coactive relationship to the wheels, serving to float and stabilize the vehicle in a manner to permit the wheels 28, 30 to be somewhat smaller, if desired, than they are in the first form of the invention. Of course, instead of the wheels 28, 30, any of the other sets of wheels can be used with float means.

It is important to note, in this regard, that although the wheels are shown in sets, quite possibly it may be desired to use the drive wheels illustrated in one of the sets with the steerable wheels of another set. Any of various combinations of steerable and drive wheels may be employed, if desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In an assembly for converting a wheeled land vehicle into an amphibious vehicle, a plurality of flotation wheels having a buoyancy sufficient to float a vehicle to which they are attached; and means for fixedly, detachably connecting said flotation wheels to the several wheels of the vehicle, for steering and driving of the flotation wheels responsive to steering and driving, respectively, of the vehicle wheels, comprising spindles projecting inwardly from said flotation wheels, and mounting plates on the spindles apertured to receive the conventional wheel-attaching lugs of the vehicle wheels, said means further including, for each flotation wheel, a plurality of U-shaped clamps connected at one end to the mounting plate thereof in positions angularly, uniformly spaced about the circumference of the mounting plate, and means connected between the other ends of the clamps tending to shift the same radially inwardly of the vehicle wheel into gripping engagement with said vehicle wheel.

2. In an assembly for converting a land vehicle, having steerable front wheels and having rear drive wheels, into an amphibious vehicle steered and propelled correspondingly to steering and driving of the vehicle on land, a plurality of flotation wheels of a size sufficient to float a vehicle to which they are attached; and means for fixedly, detachably connecting said flotation wheels in laterally outwardly spaced relation to the respective wheels of the vehicle, for steering and driving of the vehicle wheels and flotation wheels conjointly during floating of the vehicle in water, the flotation wheels connectable to said steerable front wheels each including a hollow, drum-like body, and a rudder plate spaced axially outwardly from the body and having bracket-like connections to the body at locations angularly, uniformly spaced circumferentially of the body and said rudder plate.

3. In an assembly for converting to amphibious use a vehicle provided with ground wheels and normally usable only on land, a plurality of flotation wheels, one for each ground wheel, each flotation wheel including a hollow, drum-like body having spaced heads; a spindle rigidly secured to and projecting outwardly from one of said heads in concentric relation to said one head; a mounting plate centrally secured to the outer end of the spindle and disposed substantially perpendicularly to the axis of the spindle; means for securing the mounting plate to its associated, adjacent ground wheel for rotation therewith, said spindle being of a length effective to space said body away from the associated ground wheel out of contact therewith; a flat plate concentric with said body and spaced laterally outwardly from the other head of the body; and a plurality of connecting brackets spaced circumferentially of and fixedly connected between the last-named plate and the body, said brackets spacing the last-named plate from the body wholly out of contact therewith so as to define an open space between the body and the last-named plate.

4. In an assembly for converting to amphibious use a vehicle provided with ground wheels and normally usable only on land, a structure as in claim 3 wherein the last-named plate is of a diameter approximately equal to the diameter of said body with said brackets being in the form of bars the spacing of which is selected to permit the free passage of water into and out of the space between the body and the last-named plate.

References Cited in the file of this patent

UNITED STATES PATENTS

| | | |
|---|---|---|
| 1,104,229 | Szegel | July 21, 1914 |
| 1,110,156 | Stewart | Sept. 8, 1914 |
| 1,547,265 | Ramsey | July 28, 1925 |
| 2,278,215 | Poche | Mar. 31, 1942 |
| 2,282,745 | Preston | May 12, 1942 |
| 2,304,430 | Triolo | Dec. 8, 1942 |
| 2,336,959 | Redman | Dec. 14, 1943 |
| 2,625,441 | DeRagon | Jan. 13, 1953 |
| 2,702,017 | Straussler | Feb. 15, 1955 |
| 2,710,777 | Poche | June 14, 1955 |

FOREIGN PATENTS

| | | |
|---|---|---|
| 9,445 | Norway | Aug. 22, 1900 |
| 473,396 | France | Jan. 9, 1915 |
| 617,260 | France | Nov. 19, 1926 |
| 1,018,289 | France | Oct. 15, 1952 |